United States Patent [19]

Eberle et al.

[11] Patent Number: 4,589,816
[45] Date of Patent: May 20, 1986

[54] ROBOT JOINT

[75] Inventors: Manfred Eberle; Robert Kleemann, both of Erlangen, Fed. Rep. of Germany

[73] Assignee: Mantec Gesellschaft für Automatisierungs-und Handhabungssysteme mbH, Fürth, Fed. Rep. of Germany

[21] Appl. No.: 593,853

[22] Filed: Mar. 27, 1984

[30] Foreign Application Priority Data

Apr. 6, 1983 [DE] Fed. Rep. of Germany ....... 3312404

[51] Int. Cl.$^4$ ............................................ B25J 17/00
[52] U.S. Cl. ........................................ 414/680; 414/4; 901/23; 901/25; 901/28
[58] Field of Search .............................. 901/23, 25, 28; 384/455, 563; 414/744, 4

[56] References Cited

U.S. PATENT DOCUMENTS

| | | | |
|---|---|---|---|
| 3,686,986 | 8/1972 | Ledergerber et al. ......... | 384/563 X |
| 4,046,262 | 9/1977 | Vykukal et al. .................. | 901/28 X |
| 4,096,766 | 6/1978 | Pardo et al. ...................... | 901/28 X |
| 4,300,198 | 11/1981 | Davini .............................. | 901/28 X |
| 4,343,055 | 8/1982 | Bergling .......................... | 384/455 X |

FOREIGN PATENT DOCUMENTS

| | | | |
|---|---|---|---|
| 22332 | 1/1981 | European Pat. Off. . | |
| 48905 | 4/1982 | European Pat. Off. . | |
| 48212 | 12/1982 | European Pat. Off. .............. | 901/25 |
| 1148721 | 5/1963 | Fed. Rep. of Germany . | |
| 2526504 | 7/1979 | Fed. Rep. of Germany . | |
| 1511609 | 5/1978 | United Kingdom . | |

Primary Examiner—Terrance L. Siemens
Attorney, Agent, or Firm—Kenyon & Kenyon

[57] ABSTRACT

A robot joint includes an electric drive motor and step-down transmission arranged in a tubular inner part. The output of the step-down transmission is coupled to a tubular outer part coaxially surrounding the inner part. The outer part is guided on the inner part by bearings. The joint can be disassembled axially after screw connections holding the tubular parts together are loosened.

5 Claims, 6 Drawing Figures

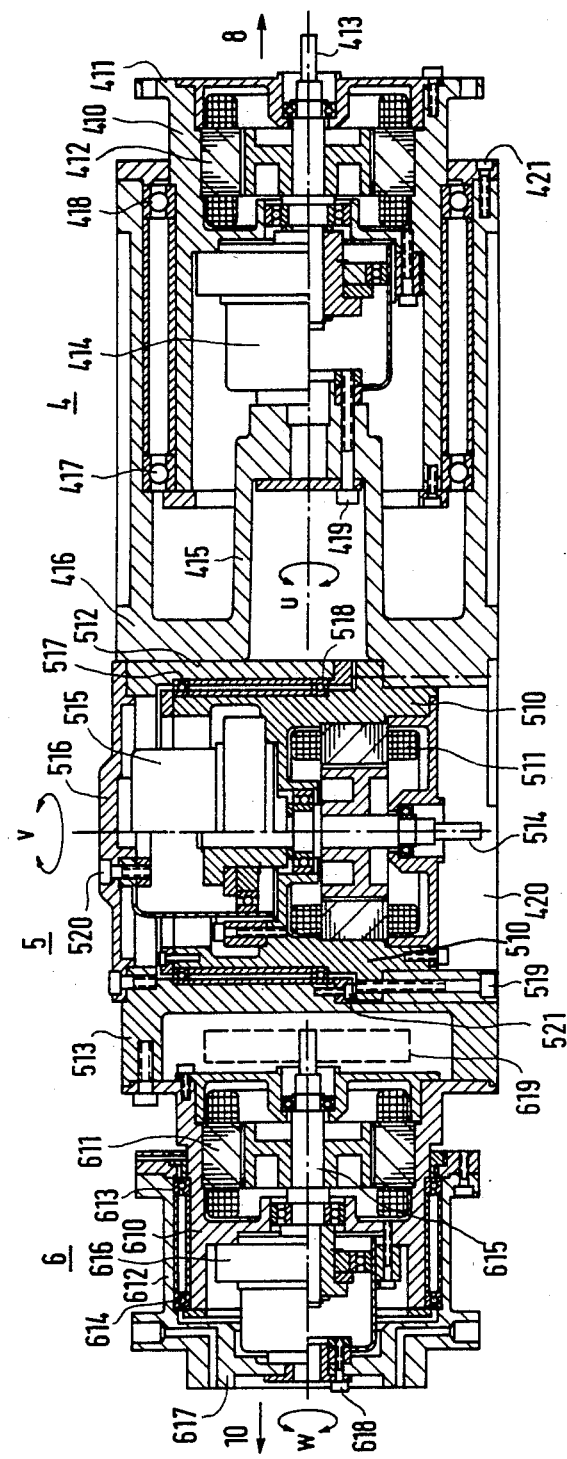

ROBOT JOINT

BACKGROUND OF THE INVENTION

The present invention relates to the field of robots, and particularly to a robot joint having an electric drive motor and step-down transmission built integrally into the housing for the motor.

Jointed robots and joint designs for robot arms are known in varied embodiments. See, for instance, German AS 25 26 504, German AS 11 48 721, European Patent Applications 22 332 and 48 905. In these arrangements, the motors and step-down transmissions are in part made integral with the joints.

Industrial robots should preferably meet the following requirements:

It should be possible to assemble them in a modular design, i.e., in the form of a building blocks. Additionally, robots should require little space and should be characterized by ease of assembly and maintenance. Furthermore, high travel velocity and positioning accuracy are required.

SUMMARY OF THE INVENTION

With the above requirements in mind, it is an object of the present invention to provide a robot joint for an industrial robot which combines space-saving design and simple assembly and disassembly. In particular, it is an object of the present invention to provide a robot joint which is modular in design, i.e., which forms one block in a robot assembled from basic building blocks.

These and other objects of the present invention are achieved in a robot joint for coupling a first robot part to a second robot part comprising drive motor means, step-down transmission means having an input coupled to the drive motor means and an output, first tubular member means disposed about the drive motor means and adapted to be coupled to the first robot part, second tubular member means disposed coaxially about the first tubular member means, bearing means disposed on the first tubular member means, the second tubular member means guided on the first tubular member means by the bearing means, the second tubular member means adapted to be coupled to the second robot part, the output of the step-down transmission means being mechanically coupled to the second tubular member means, and screw means for maintaining the first tubular member means disposed about the second tubular member means, the first and second tubular member means being disassemblable upon loosening the screw means.

To save weight and space, the first tubular member means can be designed as, or, integrally with, the motor housing.

So that large bending moments can be accommodated, it is advantageous if the second tubular member means is guided by first and second bearing means spaced apart an axial distance.

In order to accommodate the different coordinate directions, the first and second tubular member means are advantageously further provided with bosses for coupling to the first and second robot parts, respectively.

If the joint of the present invention is embodied in an elbow joint of a robot, the first and second tubular member means are preferably formed, at least in part, as robot arm end parts. Advantageously, both first and second tubular member means are then supported relative to each other axially as well as radially. Furthermore, in a preferred embodiment, the first and second tubular member means are designed as screw machine parts.

In a particularly advantageous embodiment of the invention, the first robot part comprises an upper robot arm and the second robot part comprises a robot forearm, the drive motor means and the transmission means being disposed in an end of the upper arm. The robot joint in this embodiment further comprises driver means coupled to the output of the transmission means, the driver means being further coupled to an end of the forearm, and support tube means disposed coaxially about the driver means in the end of the forearm and coupled to the robot upper arm. The bearing means further comprises first bearing means radially supporting the driver means and being disposed between the support tube means and the driver means and second bearing means disposed between the end of the upper arm and the end of the forearm and providing axial support for the forearm. Spring means are further provided for maintaining the first and second bearing means under pretension.

Three-phase motors with permanent excitation are advantageously used as the drive motors means. On the side of the drive motor means facing away from the step-down transmission means, the motor means also carries a travel distance pickup for measuring the movement of the joint about the axis of the joint.

BRIEF DESCRIPTION OF THE DRAWINGS

The invention will be described in greater detail in the following detailed description with reference to the drawings in which:

FIG. 6 is a longitudinal sectional view taken through the three assembled joints disposed between the lower arm and the gripper assembly attached to the end of the lower arm.

DETAILED DESCRIPTION

Figure 1:
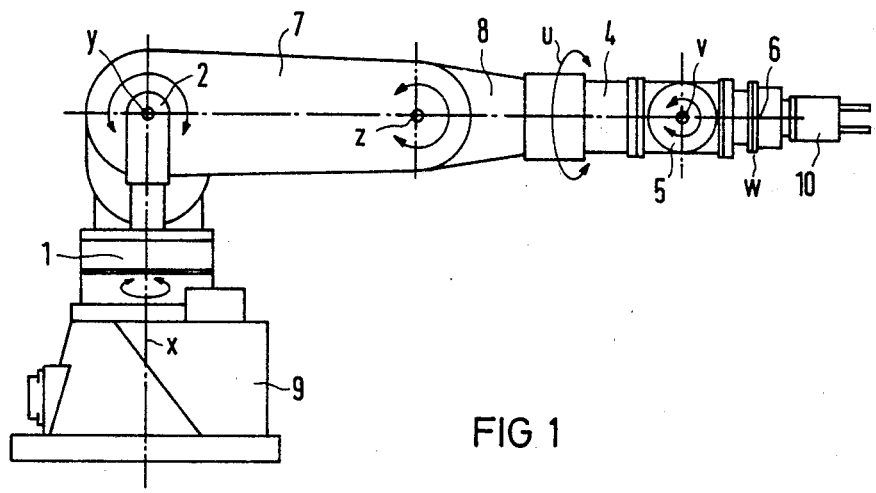
FIG. 1 is a side view of an industrial jointed robot showing the various axes of rotation of the robot joints.
Figure 2:
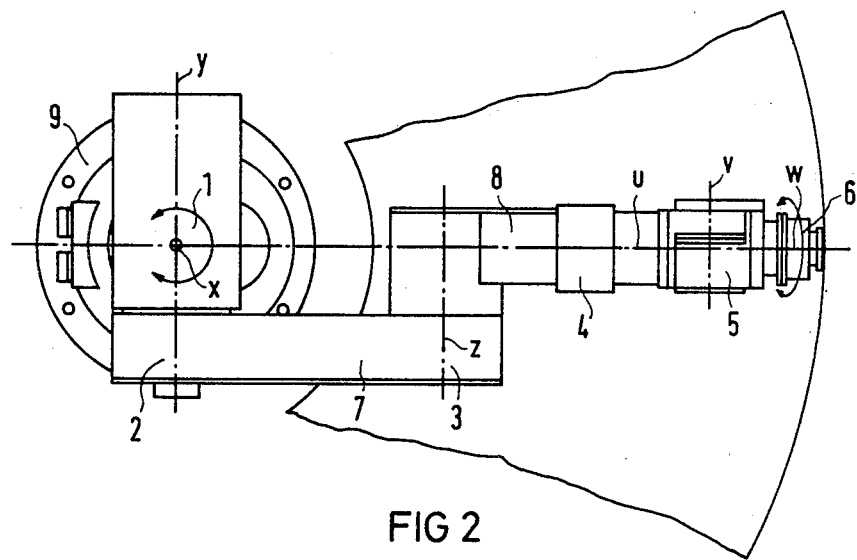
FIG. 2 is a top view of the robot shown in FIG. 1.

With reference now to the drawings, the various axes of rotation of a jointed robot are shown in FIGS. 1 and 2 by the designations x, y, z, u, v and w. Rotation about an axis is shown by the circular arrows. In the industrial jointed robot shown schematically in FIGS. 1 and 2, the joint 1, also known as a rump joint, through which rotation about the x-axis in a range of, for instance, 400° is possible, is mounted on a pedestal or base 9. A joint 2, also known as a shoulder joint, is bolted to joint 1. Rotation about the y-axis which is perpendicular to the x-axis, is possible in a range of, for instance, 250° via this joint.

An upper arm 7 is laterally fastened to joint 2. At the other end of arm 7, a joint 3 is disposed by which rotation of, for instance, 320° about the z-axis is possible, the z-axis being perpendicular to the longitudinal direction of the arm. The z-axis and the y-axis are parallel to each other.

A forearm or lower arm 8 is attached to the joint 3, also known as an elbow joint. The forearm is guided parallel to the upper arm 7. The forearm is followed by three joints 4, 5 and 6 which serve to provide rotation by 300°, 180° and 540° in the axes of rotation designated u, v and w respectively.

A gripper or hand 10 is fastened to joint 6.

As shown, the axes x, u and w lie in the same respective plane, while the axes y, v and z are parallel to each other.

Figure 3:
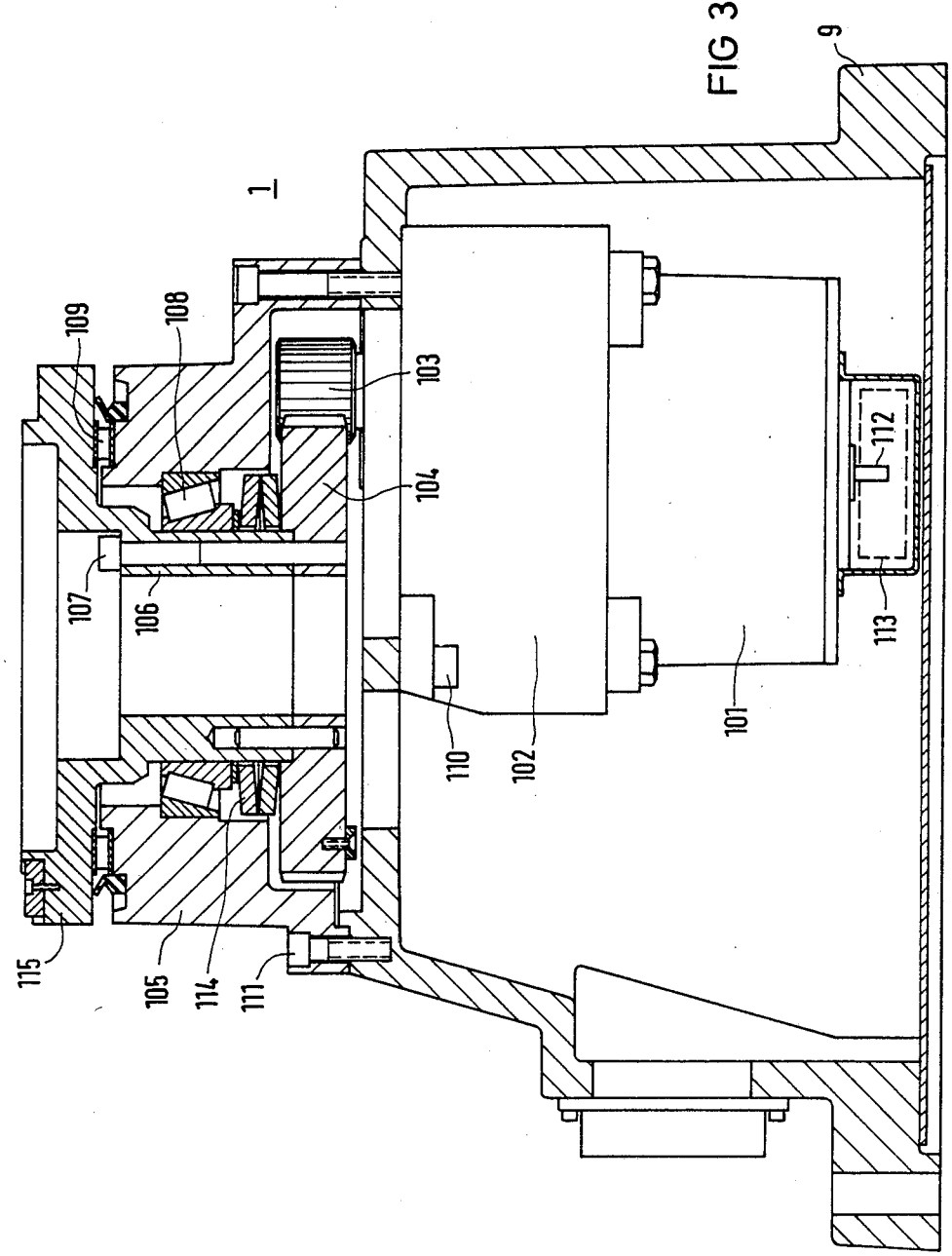
FIGS. 3 and 4 are longitudinal sectional views taken through the joints disposed between the pedestal and the upper arm of the robot of FIGS. 1 and 2.

FIG. 3 is a sectional view through joint 1 coupled to base 9. As shown, an electric drive motor 101 is arranged in the interior of the base and is fastened, together with the step-down transmission 102, to the base by means of bolts 110. A travel distance pickup 113, shown by the dashed lines, is preferably attached to the shaft end 112 of motor 101. The drive motor 101 is preferably a three-phase motor having permanent magnet excitation and a relatively low moment of inertia.

The output pinion 103 of transmission 102 meshes with a gear 104. Gear 104 is coupled to a coaxial mounting flange 106 by bolts 107. The mounting flange 106 is designed as a screw machine part. Gear 104 and flange 106 are guided axially and radially by bearings disposed in or on a bearing housing 105 which forms part of the joint housing, and specifically, axially via a needle bearing 109, and axially and radially via a conical-roller bearing 108, for example. Pretension is applied to bearings 108 and 109 by a compression spring 114. Bearing 108 is pretensioned directly by the spring 114 and bearing 109 via the force applied by the spring to gear 104 and the mounting flange 106. Since the mounting flange 106 is guided firmly at the bearing housing on a needle bearing 109 arranged on a ring of nearly the joint diameter and a conical-roller bearing 108 is preferably used, freedom from play in the joint can largely be achieved.

After the bolts 111 which compress spring 114 are loosened, the bearing housing 105 and the parts connected thereto can be lifted off pedestal 9.

Figure 4:
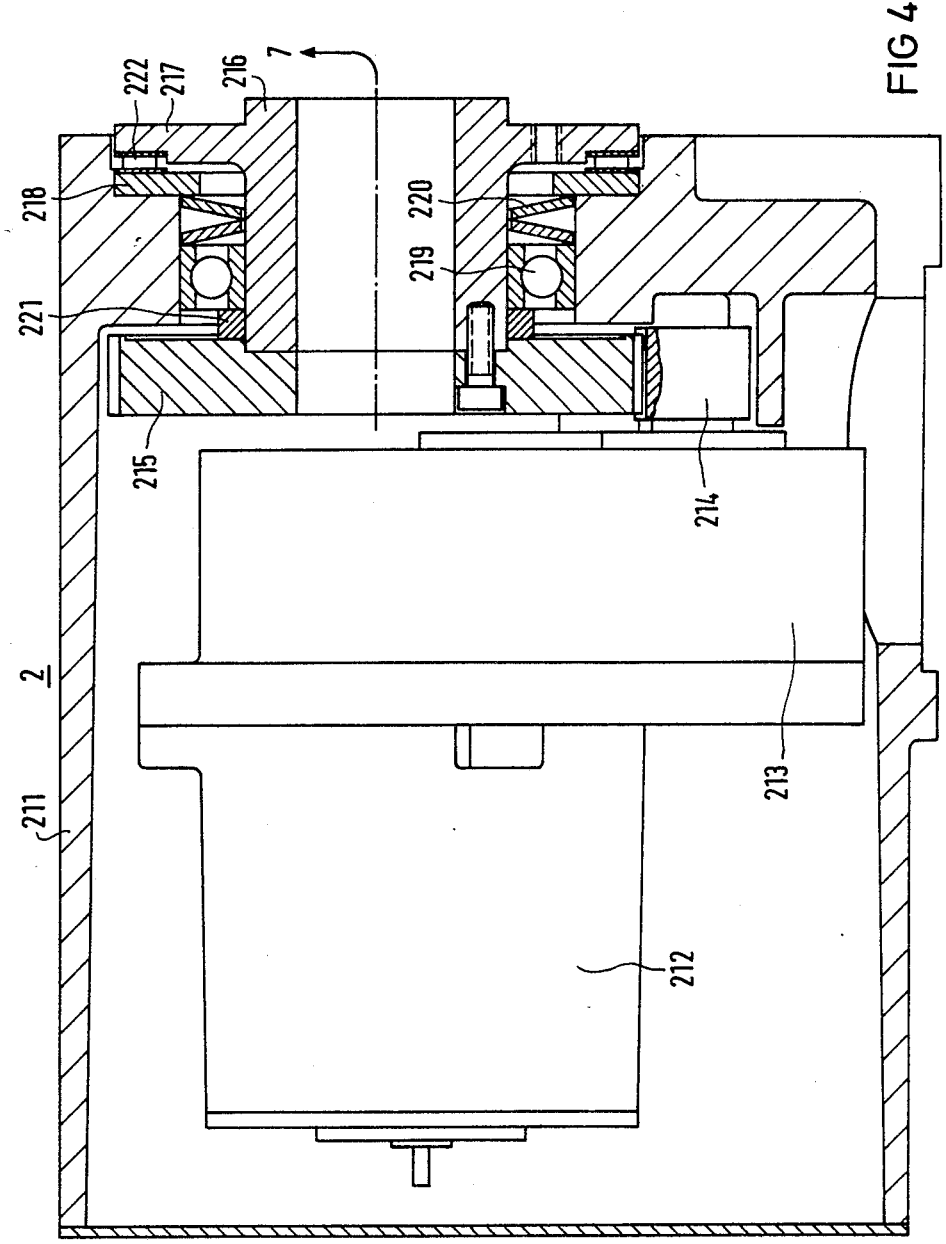

Mounting flange 106 of joint 1 can be bolted at its shoulder 115 to the joint 2 shown in FIG. 4 and specifically, to the tubular housing 211 of the joint 2.

An electric drive motor 212 built into the housing of joint 2 drives a step-down transmission 213. An output pinion 214 of the transmission meshes with a gear 215 disposed in the housing. Gear 215 is bolted to a coaxial flange 216. The ring shoulder 217 of flange 216 is axially guided via a needle bearing 222 on a pressure ring 218 bolted to the joint housing. In order to provide radial guidance for flange 216, a ball bearing 219 pretensioned by a spring 220 braced against the pressure ring 218 is disposed about flange 216. At the same time, the bearing 222 is also under pretension via a ring 221, the gear 215 and the flange 216, so that a taut play-free support is ensured.

Figure 5:
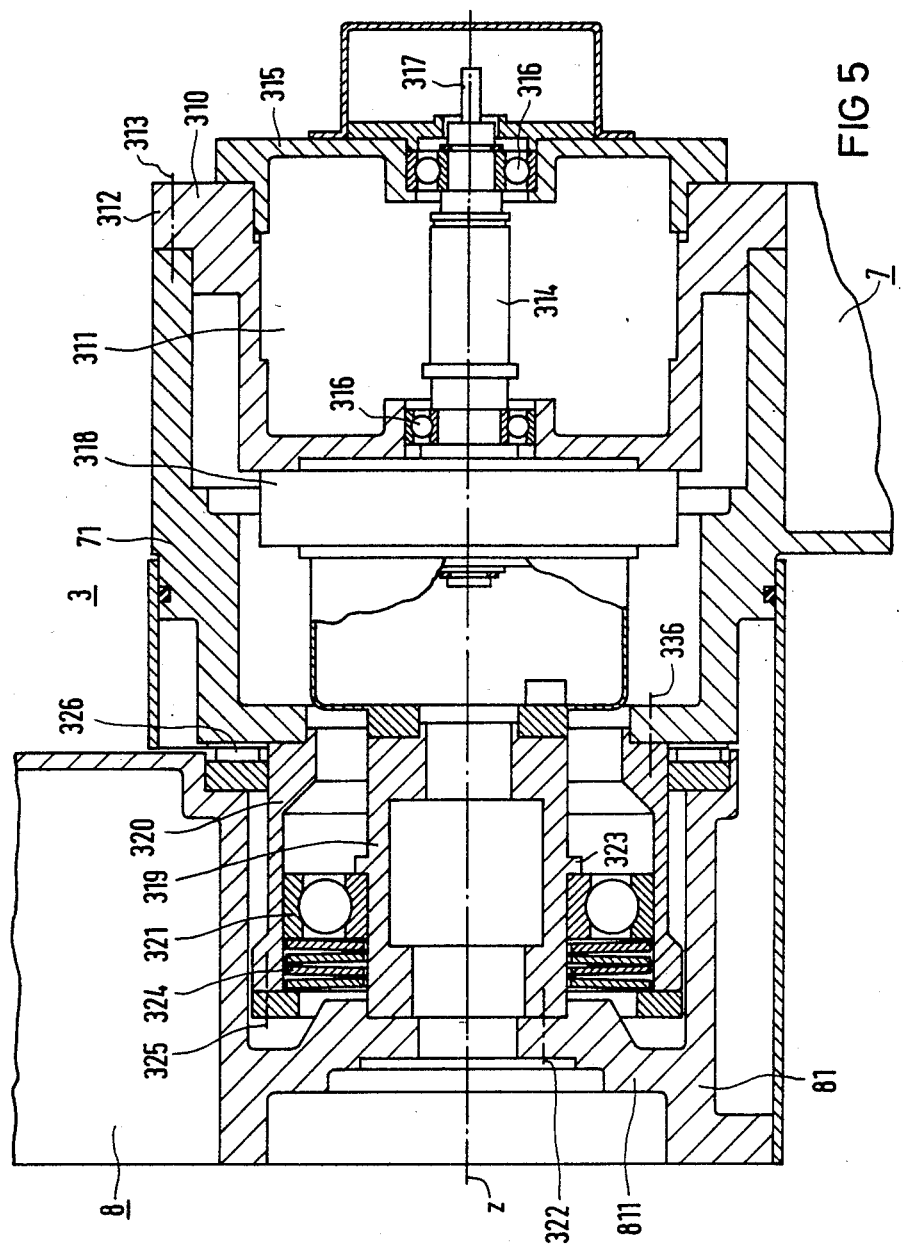
FIG. 5 is a sectional view taken through the joint between the upper and lower arms of the robot.

FIG. 5 shows the joint 3 between the upper arm 7 and the forearm 8 which provides rotation about the z-axis. The joint housing is formed essentially by two tubular end parts 71 and 81, of the upper arm 7 and the forearm 8, respectively, which are centrally adjacent.

An electric drive motor 311 is disposed in a housing 310 of the end part 71. The housing 310 for the motor 311 has a ring shoulder 312 through which bolts are provided for attaching housing 310 to end part 71 along dashed lines 313.

Shaft 314 of motor 311 is guided in ball bearings 316 arranged in housing 310 and in a bearing cover 315. The shaft 314 is provided at one end 317 with receiving threads for travel distance and speed pickups, not shown, and carries at the other end coaxially a step-down transmission 318, also known as an harmonic drive. Bolted to the step-down transmission 318 is a cylindrical driver 319 which lies in the longitudinal axis of shaft 314 and which is coaxially surrounded by tubular part 81. Cylindrical driver 319 is guided in a coaxial support tube 320 coupled to end part 71 of upper arm 7 by means of a ball bearing 321 arranged approximately along the longitudinal center line of the forearm 8. Ball bearing 321 adjoins a circular shoulder 323 of the driver 319 and is under the pretension of a compression spring 324 which is braced against a pressure ring 325 bolted to the support tube 320.

The end of driver 319 is connected to a coupling flange 811 of end part 81 of the forearm 8 via indicated screw connections 322.

Additionally, forearm 8 is guided by an axial bearing 326 which is arranged between the adjoining ring surfaces of the parts 71 and 81 and is likewise under the compensating pretension of spring 324.

The forearm 8 can be detached from the joint 3 after the screw connections 322 are loosened.

The motor 311, housing 310, transmission 318 and driver 319 can be pulled out of part 71 after the screw connections 313, indicated by broken lines, are loosened.

FIG. 6 shows the three assembled joints 4, 5 and 6 disposed between the forearm 8 and the gripper 10, by which rotation about the axes u, v and w is possible. As shown, joint 4 comprises a tubular inner part 410 designed as a screw machine part which can be bolted to the forearm 8 via a flange 411. The inner part 410 also forms the housing of an electric drive motor 412 disposed therein. The latter is preferably a three-phase motor having permanent magnet excitation and a low moment of inertia. Motor 412 is arranged next to the joint 3 so that its mass creates as little bending stress as possible.

The shaft 413 of motor 412 drives a step-down transmission 414, also known as an harmonic drive, which is arranged coaxially with the motor. Transmission 414 is fastened to inner part 410, and the output part of the transmission is bolted to a flange 415 of a tubular outer part 416, also designed as a screw machine part, and which surrounds the inner part 410 coaxially. Outer part 416 is guided against the inner part 410 via two ball bearings 417 and 418 which are spaced a distance apart. The distance between the two ball bearings 417 and 418 is chosen so that maximum moments can be taken up.

After the indicated screw connections 419 and 421 are loosened, the inner part 410 together with the motor 412 and the transmission 414 can be pulled out of the outer part 416.

The outer part 416 has an attached support part 420, to which joint 5, which allows rotation about the v-axis, is disposed.

Joint 5 includes a tubular inner part 510 which is bolted to the lateral support part 420 of joint 4. Inner part 510 also forms the housing for an electric drive motor 511. A tubular outer part 512 having mounting support 513 on one side surrounds inner part 510 coaxially. The motor shaft 514 is coupled via the attached step-down transmission 515 and a bearing cover 516 connected thereto on the output side, to outer part 512.

The inner part 510 and the outer part 512 are braced against each other via ball bearings 517 and 518. After the indicated screw connections 519 are loosened, the joint 5 can be disassembled from joint 4.

After the screw connections 520 and 521 are loosened, the inner part 510 together with the motor and the transmission can be pulled out of the outer part 512.

Joint 6 comprises tubular inner part 610 which is bolted to the mounting support 513 of joint 5 and which also forms the housing for an electric drive motor 611. A tubular outer part 612 surrounds the inner part coaxially and is braced against the inner part via spaced ball bearings 613 and 614. A drive connection between the motor shaft 615 and the outer part 612 is provided via a coaxially attached step-down transmission 616, the output of which is coupled to a flange 617 of outer part 612. Once inner part 610 is unbolted from support 513 and after the screw connections 618 are loosened, the inner part 610 together with motor 611 and transmission 616 can be pulled out of the outer part 612.

As indicated by the broken lines, a travel distance pickup 619 is arranged on the side of the motor shaft 615 facing away from transmission 616, the same as in all the other joints.

The structure described above is characterized by space-saving design, ease of maintenance and high positioning accuracy.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. A robot joint for coupling a first robot part to a second robot part comprising:
    drive motor means;
    step-down transmission means arranged in tandem with said drive motor means and having an input coupled to said drive motor means and an output;
    first tubular member means disposed about said drive motor means and said transmission means and adapted to be coupled to the first robot part, said first tubular member means forming a housing for said drive motor means;
    second tubular member means disposed coaxially about and extending around said first tubular member means;
    at least two spaced bearing means disposed on said first tubular member means, said second tubular member means guided coaxially on said first tubular member means by said spaced bearing means, said second tubular member means adapted to be coupled to the second robot part;
    said output of said step-down transmission means being mechanically coupled to said second tubular member means by a coupler part, said coupler part comprising a flange of said second tubular member means extending into said first tubular member means; and
    screw means for maintaining said first tubular member means disposed about said second tubular means, said first and second tubular member means being axially disassemblable upon loosening said screw means.

2. The robot joint recited in claim 1, further comprising projection means disposed on said first and second tubular member means adapted for coupling to said first and second robot parts respectively.

3. The robot joint recited in claim 1, wherein said first and second tubular member means comprise, at least in part, said first and second robot parts, and wherein said first and second tubular member means are disposed in axial and radial alignment.

4. The robot joint recited in claim 3 wherein said first robot part comprises an end of a robot upper arm and said second robot part comprises an end of a robot forearm, said drive motor means and said transmission means being disposed in said end of said robot upper arm, and further comprising:
    driver means coupled to the output of said transmission means, said driver means being further coupled to said end of said robot forearm;
    support tube means disposed coaxially about the driver means in the end of said robot forearm and coupled to the end of said robot upper arm;
    said bearing means further comprising first bearing means and second bearing means, said first bearing means radially supporting said driver means and being disposed between said support tube means and said driver means, said second bearing means being disposed between said end of said robot upper arm and said end of said robot forearm and providing axial support for said forearm; and
    spring means for maintaining said first and second bearing means under pretension.

5. The robot joint recited in claim 1, wherein said drive motor means comprises three-phase motor means having permanent excitation, said drive motor means having an end facing away from said transmission means, and further comprising travel distance pickup means disposed on said end.

* * * * *